(12) United States Patent
Neubrand

(10) Patent No.: US 6,305,735 B1
(45) Date of Patent: Oct. 23, 2001

(54) DISPLACEABLE FOLDING TOP FOR A MOTOR VEHICLE

(75) Inventor: Frank Neubrand, West Bloomfield, MI (US)

(73) Assignee: CTS Fahrzeug-Dachsysteme GmbH, Korntal-Muenchingen (DE)

( * ) Notice: Subject to any disclaimer, the term of this patent is extended or adjusted under 35 U.S.C. 154(b) by 0 days.

(21) Appl. No.: 09/624,044

(22) Filed: Jul. 24, 2000

(30) Foreign Application Priority Data

Jul. 24, 1999 (DE) .............................................. 199 34 892

(51) Int. Cl.⁷ ...................................................... B60J 7/12
(52) U.S. Cl. ............... 296/116; 296/107.09; 296/107.13; 296/122
(58) Field of Search ........................ 296/107.09, 107.13, 296/116, 118, 121, 122, 123

(56) References Cited

U.S. PATENT DOCUMENTS

| | | | | |
|---|---|---|---|---|
| 1,173,380 | * | 2/1916 | Pease | 296/116 |
| 1,311,717 | * | 7/1919 | Schuler | 296/116 |
| 2,578,990 | * | 12/1951 | Bessonneau | 296/116 |
| 3,047,332 | * | 7/1962 | Carpenter | 296/116 |
| 4,700,982 | * | 10/1987 | Kuraoka et al. | 296/107.09 |
| 5,118,158 | * | 6/1992 | Truskolaski | 296/146.14 |
| 5,829,821 | * | 11/1998 | Aydt et al. | 296/122 |
| 6,048,021 | * | 4/2000 | Sautter, Jr. | 296/117 |

FOREIGN PATENT DOCUMENTS

| | | | | |
|---|---|---|---|---|
| 144171 | * | 3/1931 | (CH) | 296/122 |
| 43 27 729 | | 3/1994 | (DE) . | |
| 43 44 373 | | 1/1995 | (DE) . | |

* cited by examiner

Primary Examiner—Stephen T. Gordon
Assistant Examiner—Paul Chenevert
(74) Attorney, Agent, or Firm—Crowell & Moring LLP

(57) ABSTRACT

A displaceable folding top for a motor vehicle has a folding top cover material that is held to a folding top rod system, and has a plurality of articulated rod parts. Furthermore, in the area of a vehicle side, a main hoop is arranged, which is swivel mounted to the motor vehicle and to which a sealing element is coupled. To provide a folding top that takes little space in its deposited position, and that has a high seal tightness and a long service life, the sealing element is held on a separately formed sealing frame swivelably mounted on the motor vehicle. The swiveling axes of the sealing frame and the main hoop are spaced from each other in at least one position of the folding top, and the sealing frame is displaceably coupled with the main hoop via displacement kinematics.

14 Claims, 3 Drawing Sheets

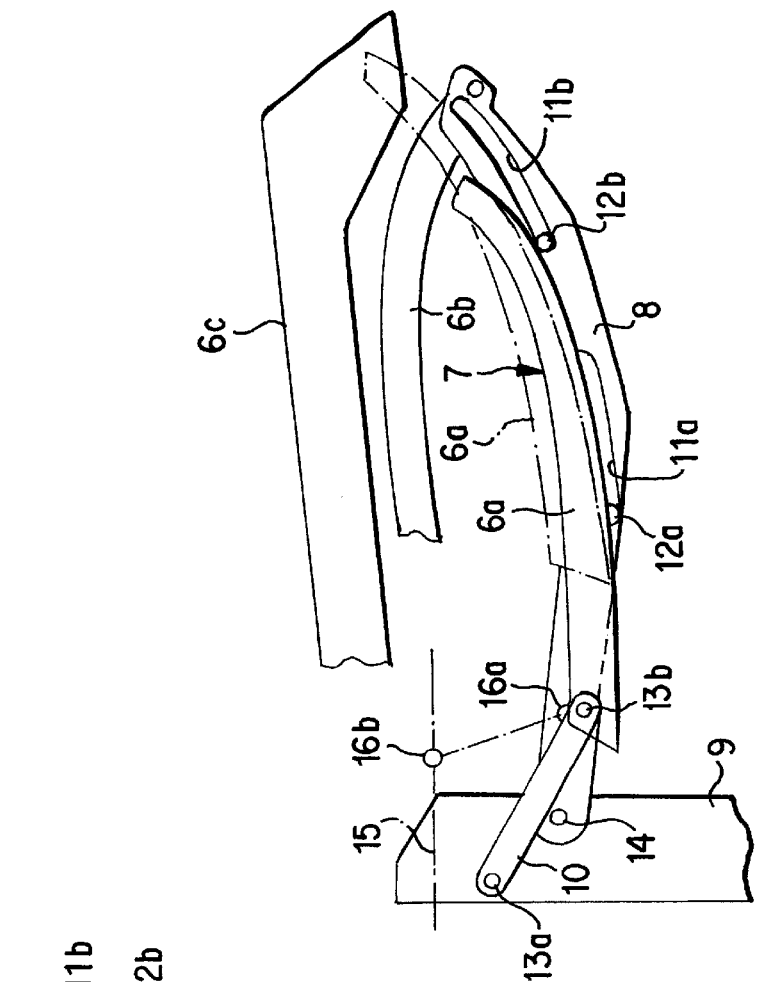
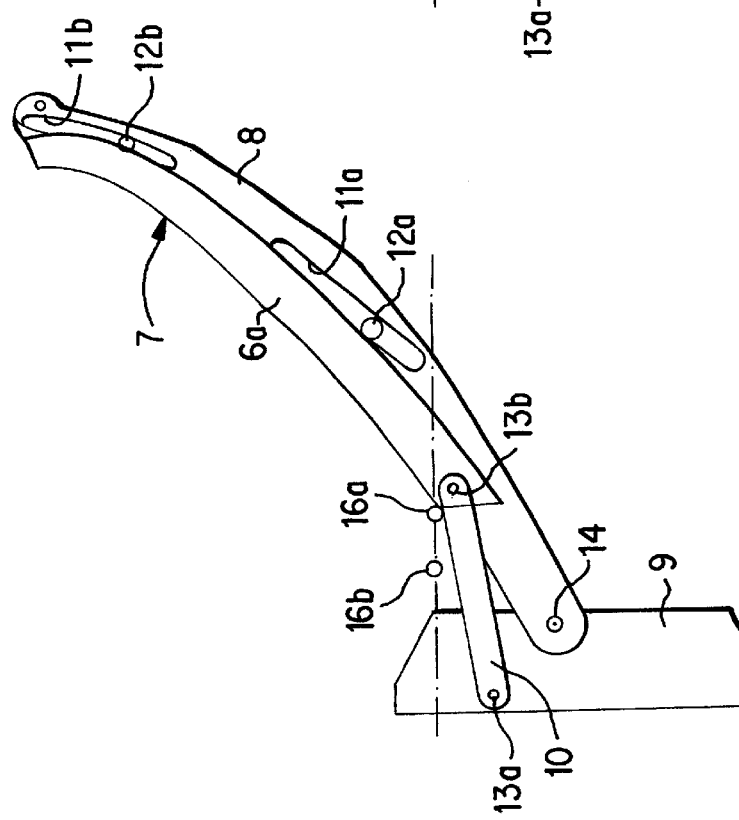

DISPLACEABLE FOLDING TOP FOR A MOTOR VEHICLE

BACKGROUND OF THE INVENTION

This application claims the priority of 199 34 892.8, filed on Jul. 24, 1999, the disclosure of which is expressly incorporated by reference herein.

The present invention relates to a displaceable folding top for a motor vehicle, and more particularly, a motor vehicle top with a folding top cover material which is held to a folding top rod system comprising a plurality of articulated rod parts with a main hoop which is arranged in an area of a vehicle side and is swivel mounted to the motor vehicle, wherein the sealing element is held to a separately formed sealing frame.

DE 43 27 729 C2 discloses a folding top provided for a convertible motor vehicle and having a kinematically displaceable folding top rod system and a folding top cover material carried by the folding top rod system. The folding top can be displaced between a closed position spanning the car interior and a deposited position opening up the car interior in which the rods and the cover material are stowed in a folding top compartment arranged behind the seats. The rod parts of the folding top are coupled in articulated manner with one another and with respect to the vehicle so that, during the conversion from closed to deposited position, they execute a spatial rotary motion.

The rod parts comprise various side and cross hoops and bows that are kinematically connected without any extra degree of mobility such that the folding top can be put up or stowed with a control motion that acts only in longitudinal direction. The folding top in its lateral area has a main hoop each on the left and right vehicle side that is firmly connected with the vehicle body by an articulated joint. To the two lateral main hoops, additional side hoops designed as a roof frame are connected in articulated manner which, in the closed position, extend up to the windshield frame and cover the side windows. To ensure a wind and watertight seal in the closed position, a circumferential sealing element is disposed along the entire roof frame including the main hoop. In the conversion to the closed position, this sealing element must assume a precisely fitting seat with respect to the window edge or the window frame and must furthermore be put in place with a relatively strong application force. To avoid leakage problems, the folding top must have a high manufacturing accuracy.

A further problem may occur in the area of fastening the material to the body in the region of the folding top compartment. To provide sufficient mobility in the conversion between deposited and closed position, the cover material has a non-fastened section (a loose material section) between the fastening on the body and the fastening to the next closest rod parts of the folding top, the main hoops. For reasons of leak tightness, the aim is to keep the length of the loose material section as short as possible without unnecessarily limiting the mobility of the folding top. Also problematic is the uncontrolled fold formation of the cover material in the non-fastened area.

A further drawback is the relatively large amount of space required by the folding top in its deposited position. Due to the far rearward and downwardly offset connection of the main hoop to the vehicle body, and due to the large continuous length of the sealing element, the main hoop executes a large, control motion extending far forward and far rearward. When the folding top is folded, the main hoop, which is swung rearward into the folding top compartment, together with the sealing element fastened thereto, requires an amply dimensioned depositing space in the corner area in vehicle longitudinal direction.

DE 43 44 373 C1 discloses a further convertible vehicle top in which a sealing strip carrying an elastic sealing element to seal the folding top in its closed position is displaceably held on a roof frame part of the folding top rod system. This ensures that the end faces of the interacting sealing elements meet. This separation into two discrete components, i.e. the roof frame part on the one hand and the displaceable sealing strip with the sealing element on the other hand, makes it possible to achieve a largely frictionless closing and opening of the sealing elements. The translatory displacement of the sealing strip, however, requires relatively high design complexity. It also makes it impossible to reduce the stowing space.

SUMMARY OF THE INVENTION

An object of the present invention is to provide a folding top that is small in its deposited position and that provides high seal tightness and a long service life.

According to the invention, this object has been achieved by providing that the sealing frame is separately swivel supported in the motor vehicle, wherein the sealing element is held to a separately formed sealing frame.

Particularly the spaced-apart swiveling axes of the main hoop and the sealing frame allow the sealing frame in its closed position to reach further forward in vehicle longitudinal direction than the main hoop and permits the use of a long continuous sealing element which spans across the side windows. In the deposited position, the stowing length of the sealing frame can be limited to no more than the stowing length of the main hoop. The spaced-apart swiveling axes of sealing frame and main hoop permit different extensions of sealing frame and main hoop in closed and deposited position even though the components may possibly have the same length.

The coupling via displacement kinematics between main hoop and sealing frame permits the sealing frame to swivel as a function of the main hoop. The displacement kinematics transfer the swiveling motion of the main hoop to the sealing frame and furthermore take into account the spaced-apart swiveling axes of the two components in that a relative motion between the two components is permitted while, at the same time, in swiveling direction of the sealing frame, actuating forces can be transferred from the main hoop to the sealing frame.

In addition to permitting a smaller stowing space, the embodiment according to the invention minimizes the loose material section between body and folding top, since the swiveling axis of the sealing frame to which the cover material can be fastened may be determined at a smaller distance from the fastening point on the sealing frame than in conventional devices with only one movable component. Based on the smaller distance between swiveling axis and fastening point on the sealing frame, the fastening point describes a partial circle with a smaller radius, whereby the length of the non-fastened material area is shortened and the tightness of the folding top is correspondingly improved.

In a currently preferred further embodiment, the swiveling axis of the sealing frame is flexibly arranged and executes a kinematically necessary movement, preferably a partial circle, as a function of the position of the folding top. Consequently, the sealing frame describes a double rotary motion, the rotation about its swiveling axis, on one hand, and the partial circle motion of the swiveling axis itself, on the other hand. Structurally, this is advantageously effected in that the sealing frame is held to the vehicle body via an additional support arm, and the support arm is rotatably held both on the motor vehicle and on the sealing frame. In connection with the displaceable guidance via the displacement kinematics between the main hoop and the sealing frame, a combined rotary and displacement motion of the sealing frame is achieved. The additional translatory component of the motion offers the advantage that the improved application force achieves a better seal between the sealing element and the side windows.

BRIEF DESCRIPTION OF THE DRAWINGS

Other objects, advantages and novel features of the present invention will become apparent from the following detailed description of the invention when considered in conjunction with the accompanying drawings.

FIGS. 3 to 6 show the main column and a section of the sealing frame in different positions.

DETAILED DESCRIPTION OF THE DRAWINGS

Figure 1:
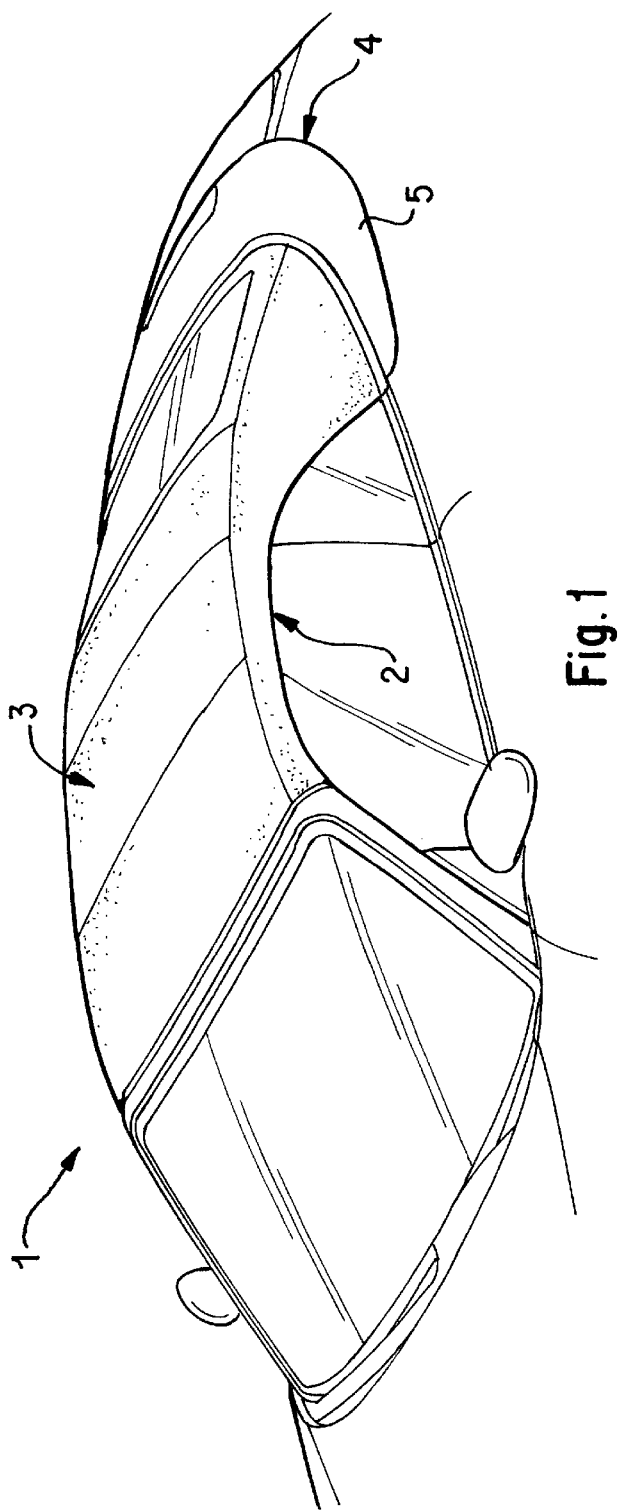
FIG. 1 is a schematic perspective view of a folding top in its closed position for use in a motor vehicle.

The folding top 1 of a motor vehicle as depicted in FIG. 1 comprises a folding top rod system 2 with a plurality of rod parts and a folding top cover material 3 stretched across the folding top rod system 2. The folding top 1 can be displaced between the closed position shown in FIG. 1 and a deposited position in which the folding top is stowed in a compartment 4 arranged behind the passenger area, which is covered by a compartment lid 5. The structure of the folding top 1, according to the invention, is described in detail in the following figures. In the embodiments depicted in the different figures, identical components are provided with identical reference symbols.

Figure 2:
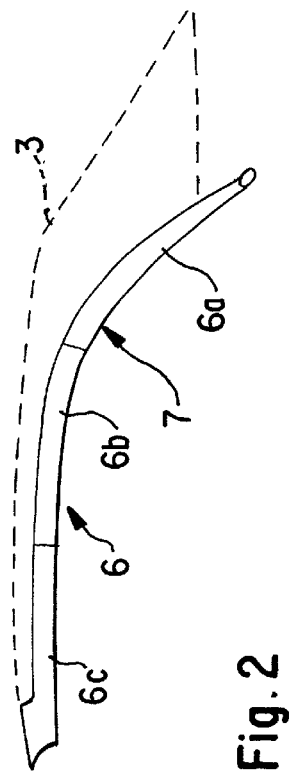
FIG. 2 is a schematic side elevation of a three-part lateral sealing frame of the folding top.

According to the schematic embodiment shown in FIG. 2, the folding top rod system comprises a multi-section sealing frame 6 with three sections 6a, 6b, 6c which are flexibly connected with one another or with the vehicle body. The sealing frame 6 in its closed position extends on one vehicle side across the length of the folding top and is provided with a sealing element 7 that ensures a watertight seal between folding top and side window. In the conversion to the deposited position, the sections 6a, 6b, 6c, including the folding top cover material 3, swivel about their articulated joint axes into a folded position.

Figure 4:
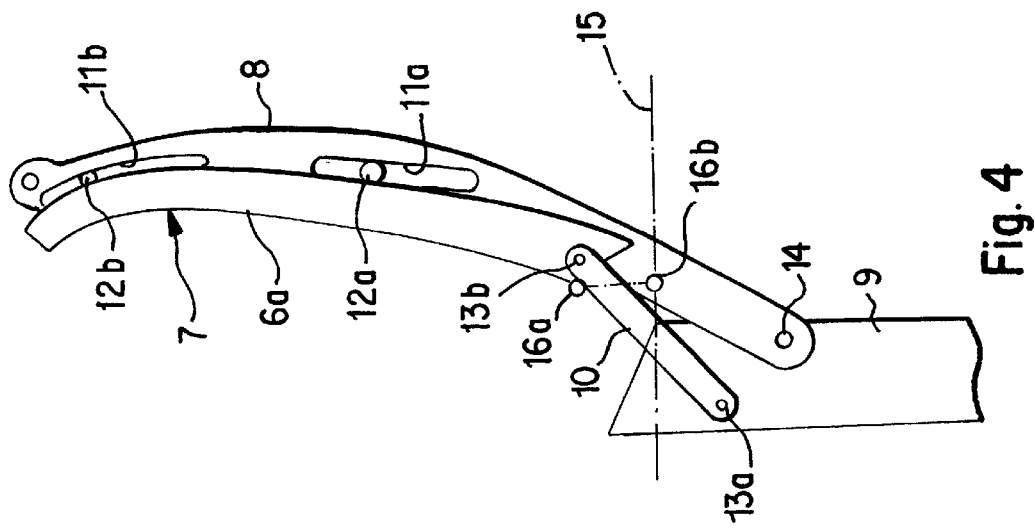
Figure 3:
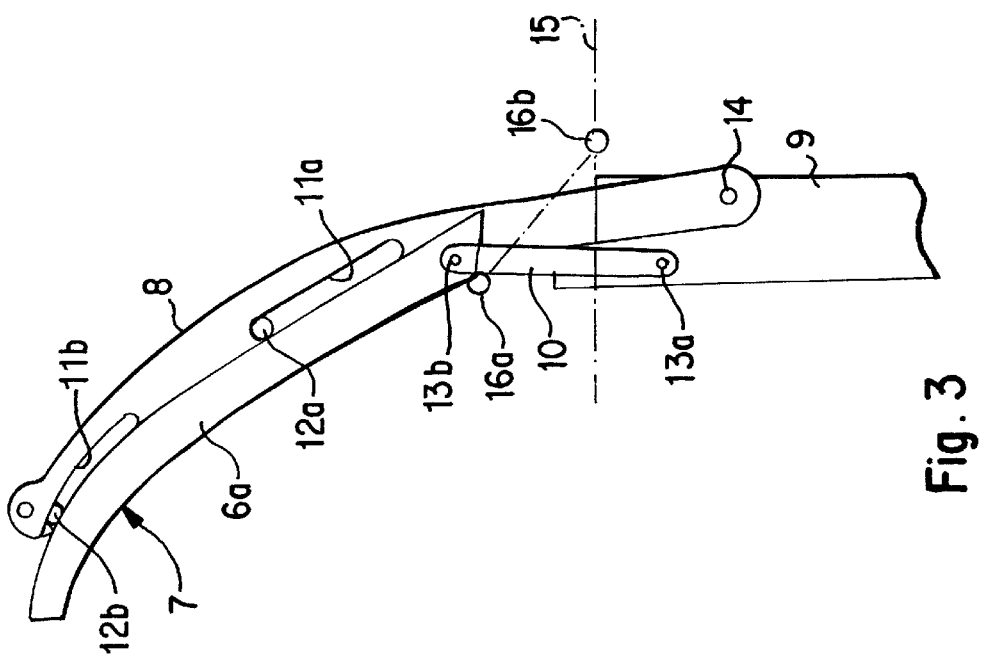

FIG. 3 through 6 show a more detailed representation of the lateral folding top kinematics. FIG. 3 shows the closed position, FIG. 4 and 5 show different intermediate positions, and FIG. 6 shows the deposited position. According to FIG. 3, the body-side sealing frame section 6a, which is flexibly adjoined by the additional sealing frame sections 6b, 6c shown in FIG. 2, is flexibly supported via a support arm 10 against a flange 9 that is firmly connected with the vehicle body. The support arm 10 has two articulated joints 13a, 13b with parallel swiveling axes for the swiveling connection of the sealing frame section 6a to the body. If the support arm 10 rotates about the swiveling axis of the body-side joint 13a, the swiveling axis of joint 13b describes a partial circle.

Furthermore, a main hoop 8 is swivel connected to flange 9 via an articulated joint 14. The main hoop 8, with which a control element advantageously engages to displace the folding top between the closed and the deposited position, additionally serves to support the roof frame as well as to transfer the control motion to the roof frame. The swiveling axis of the articulated joint 14 between the main hoop 8 and the flange 9 is parallel to the swiveling axes of the articulated joints 13a, 13b on the support arm 10.

The main hoop 8, via displacement kinematics, which in the illustrated embodiment comprise two guide channels 11a, 11b in the main hoop 8 and two guide pins 12a, 12b on the sealing frame section 6a, is kinematically coupled with the sealing frame 6 such that a control motion of the main hoop 8 effects a forced motion of the sealing frame 6. The guide channel 11a, which is adjacent to the body, is formed as a straight line so that the guide pin 12a that is slidingly supported in the guide channel 11a is translatorily displaced or moved in a straight line within guide channel 11a during a conversion movement from closed to deposited position. A constraining force directed perpendicularly to the guide channel is transferred from the main hoop 8 via the guide pin 12a to the sealing frame section 6a, which swivels the sealing frame section 6a about the swiveling axes of the articulated joints 13a, 13b. A constraining force can also be transferred from the main hoop to the sealing frame section 6a via the second guide channel 11b facing away from the body and the corresponding guide pin 12b, this second guide channel 11b being slightly curved. The sealing frame section 6a executes a mixed translatory/rotational control motion under the guiding movement of the main hoop 8. As a result, the sealing element 7 held on the side of the sealing frame 6 facing away from the main hoop 8 glides along the side window edge during the conversion to the closed position, thereby improving the seal tightness.

In the end positions-both in closed position and in deposited position-the guide pins 12a, 12b each rest in the guide channels 11a or 11b against an end face forming a limit stop, whereby the closed position (FIG. 3) and the deposited position (FIG. 6) can be met precisely.

When converting the folding top from the closed to the deposited position, the main hoop 8 executes only a rotary motion about the swiveling axis of the articulated joint 14 on the body-side flange 9. The control motion transferred via the displacement kinematics from the main hoop 8 to the sealing frame 6 results in a translatory/rotary motion in relation to the vehicle body due to the double support of the sealing frame via the support arm 10 and the two articulated joints 13a, 13b as well as due to the substantially straight line configuration of the guide channels. In this motion, the body-side sealing frame section 6a executes both a rotary motion about the swiveling axis of the body-side articulated joint 13a on the support guide 10 and a relative rotation about the swiveling axis of the articulated joint 13b between support arm 10 and section 6a.

The folding top cover material is stretched between a first fastening point 16a on the sealing frame 6 and a second body-side fastening point 16b at the height of a body line 15. In the section that lies between the fastening points 16a, 16b, which is indicated by a dashed line on each of FIGS. 3–6, there is no material fastening; i.e., loose material is present in this section.

The swiveling axes of the articulated joints 13a and 14 between the support arm 10 or the main arm (main hoop 8) and the flange 9 are spaced apart from one another. Both of the swiveling axes are below a body line 15 (dashed line), but the axis of the articulated joint 14 is spaced at a greater vertical distance from the body line 15 than the axis of articulated joint 13a. In addition, the axes also have a horizontal distance, the axis of articulated joint 13a facing the front of the vehicle, and the axis of the articulated joint 14 facing the rear area of the vehicle. In connection with the permitted relative motion between main hoop 8 and the sealing frame section 6a, the sealing frame section 6a in the closed position extends further forward in the direction of the vehicle front than the main hoop 8. In the deposited position shown in FIG. 6, however, section 6a assumes a retracted position in relation to the main hoop 8, compared to a fixed, immovable fastening of the sealing frame section on the main hoop indicated by a dashed line. The depositing area, particularly the lateral sections of the depositing area, can therefore have advantageously smaller dimensions in a vehicle longitudinal direction because the comparatively long sealing frame section 6a in the deposited position extends less far in the direction of the rear of the vehicle than the main hoop 8.

Furthermore, the area of the loose material section between the fastening points 16a, 16b is reduced and improves the seal tightness. A comparison of FIG. 3 to 6 directly shows that the maximum distance between the fastening points 16a, 16b is reached in the closed position, in which the folding top cover material is under tension and ensures a good seal with respect to the vehicle body. In the transition range between closed and deposited position as shown in FIGS. 4 and 5, the distance between the fastening points 16a, 16b is minimal. In the deposited position according to FIG. 6, the distance increases again, but is still less than the distance in the closed position of FIG. 3. In all the positions, the distance is less than in conventional designs where the cover material is swung about the axis of the main hoop and describes a circle with a greater radius.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Displaceable folding top for a motor vehicle comprising a folding top cover material associated with a folding top rod system having a plurality of articulated rod parts with a main hoop arranged in an area of a vehicle side and swivelably mounted to the motor vehicle, and a sealing element held at a separately formed sealing frame to ensure a watertight seal between the folding top and side windows on the vehicle side, wherein the sealing frame is swivelably supported on the motor vehicle separately from the main hoop, the swiveling axes of the sealing frame and the main hoop being spaced from one another in at least one position of the folding top, and a displacement kinematic apparatus displaceably couples the sealing frame with the main hoop.

2. The folding top according to claim 1, wherein swiveling axes of the sealing frame and the main hoop are spaced from each other in a vehicle longitudinal direction.

3. The folding top according to claim 1, wherein the swiveling axes of the sealing frame and the main hoop in a closed position are spaced from each other in a vertical direction.

4. The folding top according to claim 3, wherein swiveling axes of the sealing frame and the main hoop are spaced from each other in a vehicle longitudinal direction.

5. The folding top according to claim 3, wherein the swiveling axis of the sealing frame is arranged above the swiveling axis of the main hoop.

6. The folding top according to claim 1, wherein the sealing frame is translatorily displaceably coupled with the main hoop.

7. The folding top according to claim 1, wherein the displacement kinematics structure comprises a guide pin in a guide channel.

8. The folding top according to claim 7, wherein the displacement kinematics structure comprises at least two guide pins and two guide channels distributed over a length of the main hoop.

9. The folding top according to claim 1, wherein the swiveling axis of the sealing frame defines a partial circle during a displacement motion of the folding top between the closed position and a deposited position.

10. The folding top according to claim 1, wherein a support arm operatively holds the sealing frame on the motor vehicle.

11. The folding top according to claim 10, wherein the support arm is swivelably mounted to the motor vehicle and to the sealing frame.

12. The folding top according to claim 1, wherein the sealing frame is arranged adjacent to a vehicle front and the main hoop is arranged adjacent to a vehicle rear area.

13. The folding top according to claim 1, wherein the swiveling axes of the main hoop and sealing frame are parallel to each other.

14. The folding top according to claim 1, wherein the swiveling axis of the main hoop extends crosswise to a longitudinal axis of the motor vehicle.

* * * * *